United States Patent [19]

Comeaux et al.

[11] Patent Number: 5,284,308
[45] Date of Patent: Feb. 8, 1994

[54] TAPE PATH HAVING IMPLICIT SQUEEZE BEARING

[75] Inventors: Wayne T. Comeaux; Don G. East; Steven L. Felde; Douglas W. Johnson, all of Tucson, Ariz.

[73] Assignee: International Business Machines Corporation, Armonk, N.Y.

[21] Appl. No.: 908,608

[22] Filed: Jun. 29, 1992

Related U.S. Application Data

[63] Continuation of Ser. No. 689,396, Apr. 22, 1991, abandoned.

[51] Int. Cl.$^5$ .............................................. G11B 15/60
[52] U.S. Cl. ................................................... 242/199
[58] Field of Search ............... 242/198, 199, 193, 179; 360/132

[56] References Cited

U.S. PATENT DOCUMENTS

| | | | |
|---|---|---|---|
| 3,004,728 | 10/1961 | Ihle | 242/55.11 |
| 3,175,780 | 3/1965 | Nettles | 242/67.3 |
| 3,341,140 | 9/1967 | Kjos | 242/192 |
| 3,367,593 | 2/1968 | Grant | 242/192 |
| 3,405,884 | 10/1968 | Patterson, Jr. | 242/76 |
| 3,584,944 | 6/1971 | Cook | 242/199 |
| 3,656,705 | 4/1972 | Boyer | 242/192 |
| 3,806,574 | 4/1974 | Arvidson, Jr. | 264/160 |
| 3,912,144 | 10/1975 | Arseneault et al. | 226/3 |
| 3,967,789 | 7/1976 | Delerzke, Jr. | 242/56 R |
| 4,182,472 | 1/1980 | Peekna | 226/97 |
| 4,275,424 | 6/1981 | Maxey | 360/132 |
| 4,334,656 | 6/1982 | Crawford et al. | 242/195 |
| 4,380,032 | 4/1983 | Pfost | 360/132 |
| 4,389,600 | 6/1983 | Milligan et al. | 318/6 |
| 4,406,425 | 9/1983 | Bullock et al. | 242/183 |
| 4,406,906 | 9/1983 | Meyer et al. | 424/263 |
| 4,456,160 | 6/1984 | Schoettle et al. | 226/195 |
| 4,467,411 | 8/1984 | Fry et al. | 364/200 |
| 4,576,344 | 3/1986 | Sasaki et al. | 242/67.1 |
| 4,685,005 | 8/1987 | Fields, Jr. | 360/53 |
| 4,720,202 | 1/1988 | Kawakami | 242/192 |
| 4,830,303 | 5/1989 | Hagens et al. | 242/67.1 |

FOREIGN PATENT DOCUMENTS

| | | | |
|---|---|---|---|
| 840838 | 5/1939 | France | 242/192 |
| 2454153 | 11/1980 | France | 360/132 |
| 2454153 | 11/1980 | France | 360/132 |

OTHER PUBLICATIONS

J. L. Garcia et al., "Complaint Guide Assembly with High Wear Resistance Contact Pad", Oct. 1986, IBM Tech. Discl. Bulletin, vol. 29, No. 5, pp. 2126-2127.

R. B. Watrous, "Squeeze Bearing with Sleeve Member Having Slit Corners", Dec. 84, IBM Tech. Discl. Bulletin, vol. 27, No. 7A, pp. 3916-3917.

F. Hendriks "Digital Tactile Sensor", Sep. 1984, IBM Tech. Discl. Bulletin, vol. 27, No. 4A, p. 2191.

Primary Examiner—Daniel P. Stodola
Assistant Examiner—John Q. Nguyen
Attorney, Agent, or Firm—D. A. Shifrin; M. W. Schecter

[57] ABSTRACT

A tape path having an implicit squeeze bearing. In such a tape path, one end of the tape is wound upon a first reel, the tape extends around one or more guides, briefly comes into close proximity with itself at the outer wrap of the tape wound upon the first reel, and is wound upon a second reel. By coming within close proximity with itself, the tape forms an implicit squeeze bearing which damps tape tension variation, inhibits the transmission of vibrations from one reel to the other, and eliminates the entrapment of entrained air without any additional rollers or other components. The tape path is suitable for use in a peripheral storage device, such as a magnetic tape drive, and is compatible with a variety of tape cartridge configurations.

15 Claims, 2 Drawing Sheets

TAPE PATH HAVING IMPLICIT SQUEEZE BEARING

This application is a continuation of application Ser. No. 07/689,396, filed Apr. 22, 1991, now abandoned.

BACKGROUND OF THE INVENTION

1. Field of the Invention

This invention relates to a tape path which minimizes the components required to control tape tension, vibrations, and winding disturbances. More particularly, the invention is a tape path having an implicit squeeze bearing.

2. Description of the Related Art

Magnetic tape drives typically use a reel-to-reel tape transport design, or "tape path", for controllably advancing the tape past an adjacent tape head. The tape head includes one or more magnetic transducers for writing to and/or reading from the tape. The tape is wound upon 2 reels, one reel at each end. The tape is advanced by rotation of such reels. One problem in reel-to-reel tape paths is tape velocity and tension variation. Variations in tape velocity and tension cause vibration. Tape vibration can be characterized according to the propagation velocity of the vibratory mode, the length and geometry of the vibration transmission path, and the terminating conditions of the vibration transmission path. Tape vibration modes include shear waves, longitudinal waves, out-of-plane resonant bands, and other path resonances. Such vibration in the tape can disrupt the head-tape interface, and thus effects the overall operation of the drive.

Existing tape drives control tape tension and vibration in several ways. The IBM 3420 Magnetic Tape Drive and the IBM 3850 Mass Storage Subsystem employ a combination of rollers and vacuum columns for such a purpose. For example, see U.S. Pat. No. 3,912,144. The IBM 3480/3490 Magnetic Tape Subsystem uses a tape tension transducer in a closed loop tension servo control configuration, as disclosed in U.S. Pat. Nos. 4,406,906 and 4,389,600. These and other drives may also use compliant members or tension arms to control tape tension and dampen vibration. U.S. Pat. Nos. 4,456,160, 4,182,472, 3,806,574, 3,175,780, and 3,004,728 disclose various aspects of tape control, such as guiding rollers and flanges. All of the aforementioned controls use devices ancillary to the reels and tape, which adds both expense and complexity to the tape path.

Another problem in reel-to-reel tape paths is air which is entrained in the windings of tape as it is wound upon a reel. The entrained air is trapped into pockets and can result in abrupt tape slippage and changes in tape tension which not only disrupt the head-tape interface, but can also result in catastrophic damage to the tape. The consequences of entrained air depend upon such parameters as the material properties of the tape, the design of the reels and guides used in the tape path, and the winding rate and geometry. Entrained air can be prevented by winding the tape in a vacuum, but such is expensive and inconvenient. U.S. Pat. No. 4,830,303, 4,576,344, and 3,405,884 disclose rollers which are used to control the entrainment of air. Again, rollers are ancillary to the reels and tape and are therefore undesirable. U.S. Pat. No. 3,967,789 also refers to the entrainment of air in a tape winding mechanism.

SUMMARY OF THE INVENTION

In view of the foregoing, it is the principal object of this invention to improve tape paths.

Another object of this invention is a tape path which minimizes the components required to damp tape tension variation and inhibit the transmission of tape vibration.

Still another object of this invention is a tape path which minimizes the components required to eliminate winding disturbances, such as air entrained into and trapped within the tape windings.

These and other objects of this invention are accomplished by a tape path having an implicit squeeze bearing. In such a tape path, one end of the tape is wound upon a first reel, the tape extends around one or more guides, briefly comes into close proximity with itself at the outer wrap of the tape wound upon the first reel, and is wound upon a second reel. By coming into close proximity with itself, the tape forms an implicit squeeze bearing which damps tape tension variation, inhibits the transmission of vibrations from one reel to the other, and reduces the entrapment of entrained air without any additional rollers or other components. Because vibration is minimized, additional components otherwise required to control tape tension are eliminated. The tape path is suitable for use in a peripheral storage device, such as a magnetic tape drive, and is compatible with a variety of tape cartridge configurations.

The foregoing and other objects, features, and advantages of the invention will be apparent from the following more particular description of the preferred embodiment of the invention, as illustrated in the accompanying drawing.

DESCRIPTION OF THE PREFERRED EMBODIMENT

Figure 1:
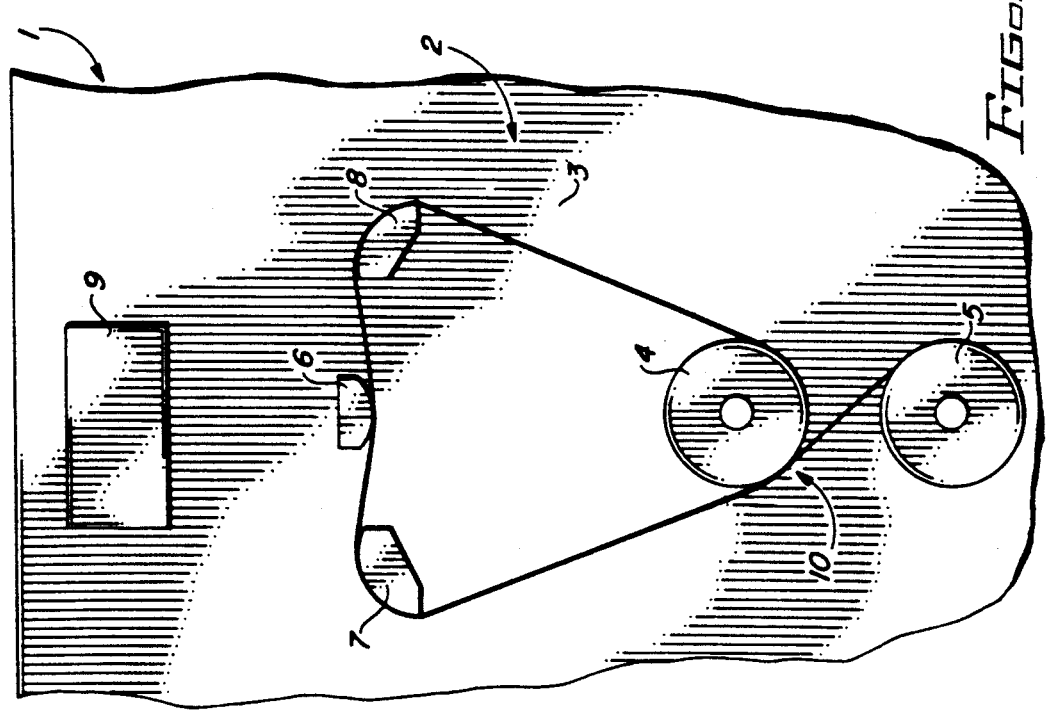
FIG. 1 is a schematic diagram of a magnetic tape drive according to the invention.

Referring now more particularly to the drawing, like numerals denote like features and structural elements in the various figures. The tape path of the invention will be described as embodied in a magnetic tape drive. Referring to FIG. 1, a schematic diagram of a magnetic tape drive 1 is shown. Drive 1 includes a tape path 2, which is that portion of drive 1 in contact with a magnetic recording tape 3. Tape 3 may be any flexible magnetic recording tape; the composition of the tape is not relevant to the subject invention. A suitable tape is disclosed in U.S. Pat. No. 4,467,411, hereby incorporated by reference.

Tape 3 is wound at one end upon a first tape reel 4 and wound at the other end upon a second tape reel 5. Reels 4 and 5 are mechanically driven to rotate in either direction, as required to position the desired portion of tape 3 in close proximity adjacent to a magnetic tape head 6. Head 6 includes one or more magnetic transducers capable of magnetically writing data to and/or reading data from tape 3. The type of head is not relevant to the subject invention, a suitable head s disclosed in U.S. Pat. No. 4,685,005, hereby incorporated by reference.

Data (including analog or digitally encoded audio, visual, or any computer related data) is recorded in one or more tracks on tape 3 using any available recording format. The position of tape 3 relative to head 6 is maintained by tape guides 7 and 8. The type of guides is not relevant to the subject invention, a suitable hydrostatic air bearing guide is disclosed in Garcia et al, Compliant Guide Assembly with High Wear Resistance Contact Pads, IBM Technical Disclosure Bulletin, Vol. 29, No. 5, October, 1986, pp. 2126-27, hereby incorporated by reference.

The operation of reels 4 and 5 and head 6 is managed by controller 9 to controllably write data to and/or read data from tape 3. The electrical and mechanical connections to controller 9, the operation of controller 9, and additional components in path 2 are not relevant to the invention. Sample information is available in U.S. Pat. Nos. 4,467,411, 4,406,425, and 4,389,600, all of which are hereby incorporated by reference.

Vibration and entrained air are controlled by a squeeze bearing 10. A squeeze bearing may take many forms, as disclosed for example in Watrous, Squeeze Bearing with Sleeve Member having Slit Corners, IBM Technical Disclosure Bulletin, Vol 27, No. 7A, December, 1984, pp. 3916-17 and Hendriks, Digital Tactile Sensor, IBM Technical Disclosure Bulletin, Vol. 27, No. 4A, September, 1984, p. 2191, but generally includes a thin layer of a gas (such as air) used to support a solid physical element. Here, squeeze bearing 10 is an "implicit" squeeze bearing in that it is formed by allowing tape 3 to come within close proximity of itself—no ancillary devices are used. For example, as tape 3 is wound from reel 5 to reel 4, the tape exits reel 5 where it comes within close proximity of the outer wrap of tape previously wound (further along its length) upon reel 4, before looping around guides 7 and 8 and being spooled upon reel 4. In the reverse direction, tape 3 exits reel 4, is looped around guides 8 and 7, comes within close proximity of the outer wrap of tape still wound upon reel 4, and is spooled upon reel 5.

In actual operation, squeeze bearing 10 does not allow tape 3 to contact itself. At normal operating velocities of tape 3, a thin film of air is formed between the two surfaces of the tape. Such an air bearing supports a portion of tape 3 (that portion entering or exiting reel 5). The two surfaces have identical velocities, thereby precluding wear of either surface. As used herein, the term "squeeze bearing" refers to the gas film between the surfaces of the tape, depending upon the velocity of the tape. When tape 3 is motionless or moving at low velocities, the squeeze bearing collapses and the tape actually contacts itself. In either condition, the tape applies a force to itself. The amount of force applied depends upon the winding rates, tensions, and geometries. The "close proximity" of the tape to itself refers to either condition.

Squeeze bearing 10 has several benefits. The squeeze bearing film acts so as to damp tape tension variation. The squeeze bearing region also acts to inhibit vibration from reel 5 from being transmitted along the tape to the area of head 6. The force applied to the outer wrap of tape 3 on reel 4 acts similar to a simple roller to exhaust the entrained air otherwise entrapped between the wound wraps of the tape on reel 4. The force determining parameters can be selected to control the air film thickness to within the range of surface asperity heights, thereby securing each sequential wrap of tape in place and preventing slippage or damage to the tape. Using typical ½ inch or 8 mm magnetic tape, a series of frequency response measurements made at tape velocities ranging from 1 to 5 meters per second and at 2.2 and 3.6 ounces tape tension indicated the squeeze bearing becomes effective in the 1 to 2 meters per second range. In addition, when the tape is motionless, reel 5 has little effect on tape tension. Finally, the short unsupported tape length between the squeeze bearing and reel 5 assists in stacking tape on reel 5.

Typical reel-to-reel tape paths wind the tape on each reel with the recording side (the side on which data is recorded and therefore the side facing the transducing head) of the tape facing in toward the center of the respective reel. The tape drive shown in FIG. 1 is configured such that the recording side of the tape on one reel faces in toward the center of the reel and that on the other reel faces away from the center of the reel. As shown, the recording side of the tape wound on reel 5 faces in toward the center of such reel and the recording side of the tape wound on reel 4 faces away from the center of such reel. If desired, such configuration could be changed. For example, the recording side of the tape wound on both reels could be made to face in toward the center of the respective reel. Such is accomplished by winding tape 3 in from the upper left side of reel 5 by rotating reel 5 counterclockwise (as shown, tape 3 winds into the reel from the upper right side by rotating reel 5 clockwise), and by adjusting the position of reel 5 so as to maintain the existence of squeeze bearing 10. The characteristics of some tapes and tape cartridges may provide environmental, shipping, and long term storage advantages to particular configurations, the details of which are not part of the subject invention.

Many reel-to-reel tape paths include the transducing head on the same side of the tape as the tape guides. In addition, one or both of the reels may be packaged into a tape cartridge. In the embodiment shown in FIG. 1, head 6 is on the opposite of side tape 3 from guides 7 and 8, and reels 4 and 5 and guides 7 and 8 can be packaged into a single tape cartridge so long as accommodation is made to provide air for the air bearing of guides 7 and 8. If non-air bearing guides are used, no such accommodation is required. Head 6 is not part of the cartridge, but is mounted in drive 1 and mated with tape 3 upon insertion of the cartridge. The configuration of the cartridge, including the location of the reels and guides, and the opening therein to allow for the mating of head 6 and tape 3, is not part of the subject invention except as specified herein.

Figure 2:
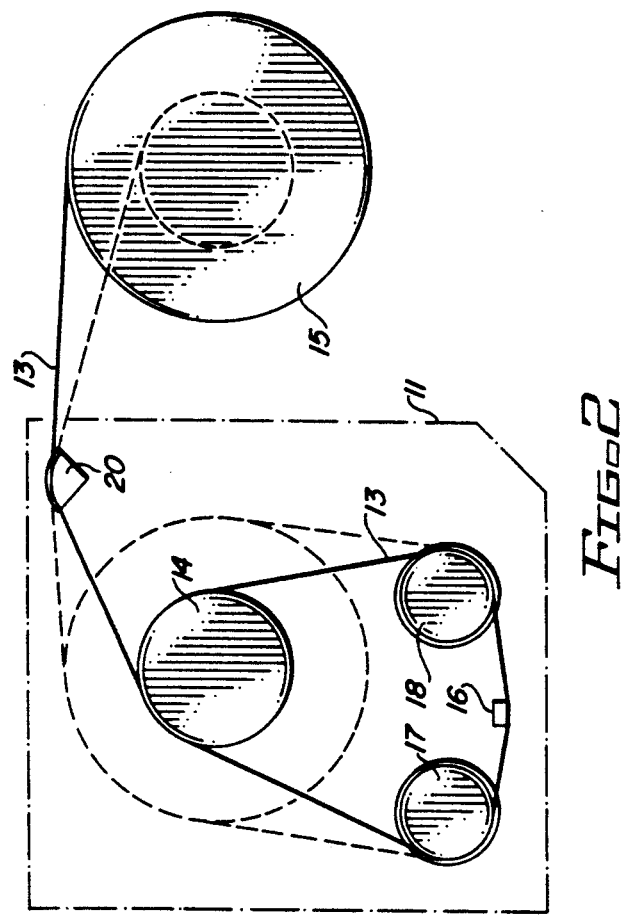
FIG. 2 is a schematic diagram of a magnetic tape path, using the IBM 3480/3490 Magnetic Tape Cartridge, according to the invention.
Figure 3:
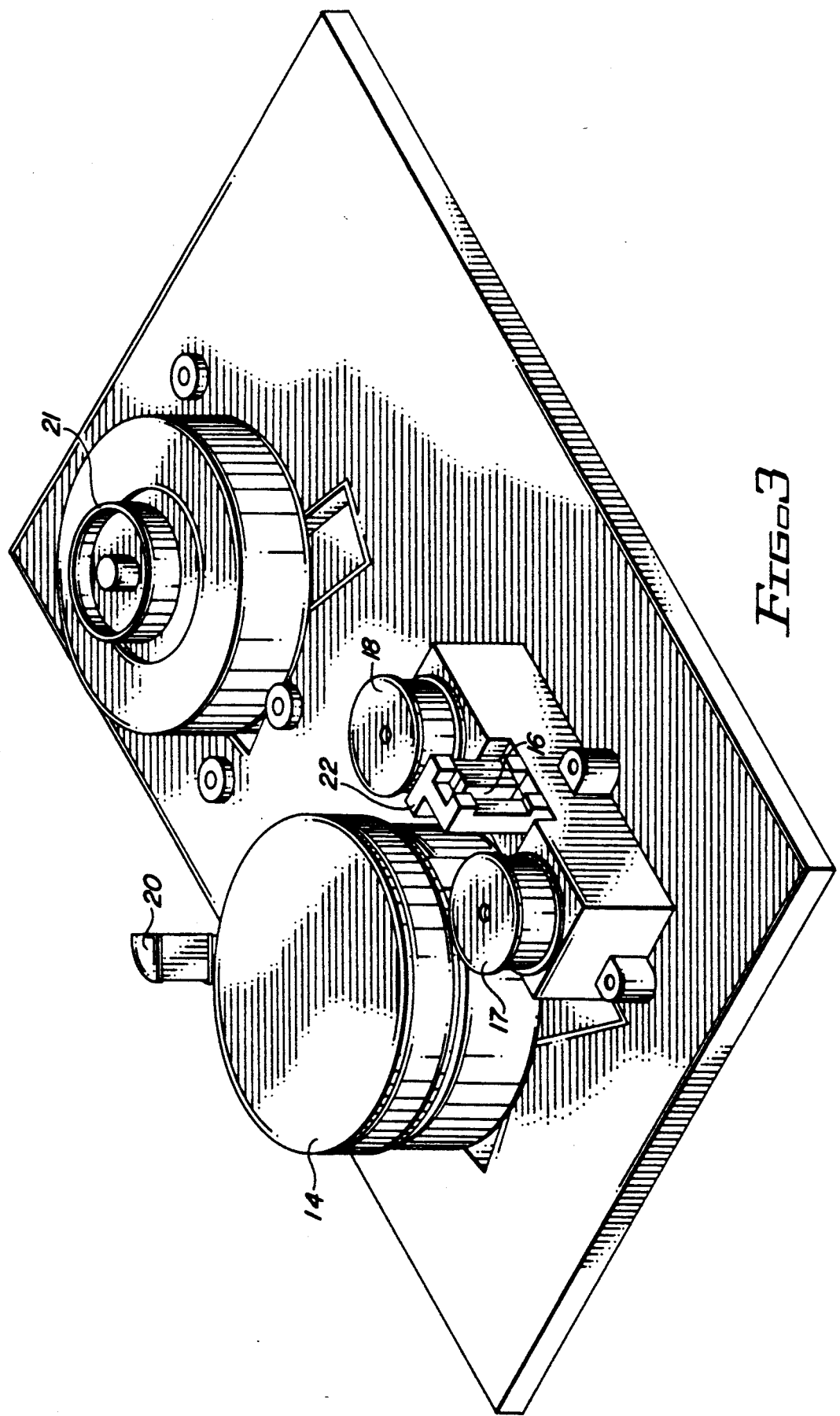
FIG. 3 is an isometric view of a magnetic tape path, without the tape itself, according to FIG. 2.

Referring to FIG. 2, an embodiment is shown in which head 16 is located on the same side of tape 13 as guides 17 and 18 and the tape cartridge only includes reel 15. Reel 14, head 16, and guides 17 and 18 are not part of the cartridge, but are mounted in drive 11. Upon insertion of the cartridge into drive 11, the end of tape 13 is removed from reel 15 and threaded through the tape path and onto reel 14. A guide 20 may be used, if required, to adjust the position of tape 13 between reels 14 and 15. As shown, guide 20 is included in drive 11, but such may also be included in a tape cartridge with reel 5. The dashed line indicates the changing position of tape 13, including its outer most wrap about reels 14 and 15 as it is transferred between reels over time. The recording side of tape 13 always faces toward the center of reels 14 and 15. A suitable cartridge is an IBM 3480/3490 Magnetic Tape Cartridge, but ay compatible cartridge could be used as the cartridge configuration is not part of the subject invention except as specified herein. FIG. 3 shows the embodiment of FIG. 2 in more detail. Reel 15 has been removed for convenience, thereby revealing cartridge mounting hub 21. Tape 13 is thus also not shown. Head 16 is shown in mounting bracket 22. Further description of a tape cartridge and threading apparatus suitable for such an embodiment is shown in U.S. Pat. No. 4,334,656, hereby incorporated by reference.

While the invention has been described with respect to a preferred embodiment thereof, it will be understood by those skilled in the art that various changes in detail may be made therein without departing from the spirit, scope, and teaching of the invention. For example, the invention has been described as practiced in a magnetic tape drive, but could be practiced in other applications, such as an optical tape drive, or in the path of any flexible web. Accordingly, the invention disclosed herein is to be limited only as specified in the following claims.

What is claimed is:

1. A path for a flexible web comprising:
   a first rotatable reel and a second rotatable reel;
   a web guide;
   a flexible web having a first end wound upon the first reel, a second end wound upon the second reel, and a middle portion between the first reel and the second reel, the middle portion extending from the first reel, around the web guide, and, when said web is motionless and taut, contacting the first end without winding upon the first reel before winding onto the second reel, the middle portion not contacting the second end before winding onto the second reel regardless of the relative amount of the web wound upon the first and second reels; and
   means for controllably rotating the first and second reels to advance said web at a velocity sufficient to prevent the middle portion from contacting the first end yet forming an air film between the first end and the middle portion without the middle portion winding upon the first reel.

2. The path of claim 1 wherein the web includes a first and a second side, the web wound upon one reel with the first side facing into the center of such reel and wound upon the other reel with the second side facing into the center of such other reel.

3. The path of claim 1 wherein the web guide is an air bearing guide.

4. The path of claim 1 wherein the flexible web is a data recording tape.

5. A recording tape path comprising:
   a first rotatable reel and a second rotatable reel;
   a first and a second tape guide;
   a flexible recording tape having a first end wound upon the first reel, a second end wound upon the second reel, and a middle portion between the first reel and the second reel, the middle portion extending from the first reel, around the first and second tape guides, and, when the tape is motionless and taut, contacting the first end without winding upon the first reel before winding upon the second reel, the middle portion not contacting the second end before winding upon the second reel regardless of the relative amount of the tape wound upon the first and second reels;
   means for controllably rotating the first and second reels to advance the tape at a velocity sufficient to prevent the middle portion from contacting the first end yet forming an air film between the first end and the middle portion without the middle portion winding upon the first reel; and
   a transducing head adjacent the tape between the first and second tape guides in the direction of tape length.

6. The path of claim 5 wherein the tape includes a first and a second side, the tape wound upon one reel with the first side facing into the center of such reel and wound upon the other reel with the second side facing into the center of such other reel.

7. The path of claim 5 wherein the first and second tape guides are air bearing guides.

8. A tape drive comprising:
   a first rotatable reel;
   a tape guide;
   means for mounting a tape cartridge, the tape cartridge including:
   a second rotatable reel; and
   a flexible tape wound upon the second reel;
   means for extending the tape around the tape guide and winding it upon the first reel when the tape cartridge is mounted in the tape drive such that a first end of the tape is wound upon the first reel, a second end of the tape is wound upon the second reel, and a middle portion of the tape is between the first reel and the second reel, the middle portion extending from the second reel, contacting the first end without winding upon the first reel when the tape is motionless and taut, and extending around the tape guide before winding upon the first reel, the middle portion not contacting the second end before winding upon the second reel regardless of the relative amount of the tape wound upon the first and second reels;
   a transducing head mounted to be adjacent the tape when the tape cartridge is mounted in the tape drive;
   means for controllably rotating the first and second reels to advance the tape past the head at a velocity sufficient to prevent the middle portion from contacting the first end yet forming an air film between said first end and said middle portion without said middle portion winding upon the first reel, said rotating means capable of being coupled to the first and second reels when the tape cartridge is mounted in the tape drive; and
   means coupled to the head for controllably operating the transducer to write to and/or read from the tape.

9. The drive of claim 8 wherein the tape includes a first and a second side, the tape wound upon one reel with the first side facing into the center of such reel and wound upon the other reel with the second side facing into the center of such other reel.

10. The drive of claim 8 wherein the tape guide is an air bearing guide.

11. The drive of claim 8 wherein the velocity is greater than one meter per second.

12. A tape drive comprising:
   means for mounting a tape cartridge, the tape cartridge including:
   a first rotatable reel and a second rotatable reel;
   a tape guide; and
   a flexible tape having a first end wound upon the first reel, a second end wound upon the second reel, and a middle portion between the first reel and the second reel, the middle portion extending from the first reel, around the tape guide, and when the tape is motionless and taut, contacting the first end without winding upon the first reel before winding upon the second reel, the middle portion not contacting the second end before winding upon the second reel regardless of the relative amount of the tape wound upon the first and second reels;

a transducing head mounted to be adjacent the tape when the tape cartridge is mounted in the tape drive;

means for controllably rotating the first and second reels to advance the tape past the head at a velocity sufficient to prevent the middle portion from contacting the first end yet forming an air film between said first end and said middle portion without said middle portion winding upon the first reel, said rotating means capable of being coupled to the first and second reels when the tape cartridge is mounted in the tape drive; and means coupled to the head for controllably operating the transducer to write to and/or read from the tape.

13. The drive of claim 12 wherein the tape includes a first and a second side, the tape wound upon one reel with the first side facing into the center of such reel and wound upon the other reel with the second side facing into the center of such other reel.

14. The drive of claim 12 wherein the tape guide is an air bearing tape guide.

15. The drive of claim 12 wherein the velocity is greater than one meter per second.

* * * * *

UNITED STATES PATENT AND TRADEMARK OFFICE
CERTIFICATE OF CORRECTION

PATENT NO. : 5,284,308
DATED : February 8, 1994
INVENTOR(S) : Wayne T. Comeaux, et. al.

It is certified that error appears in the above-indentified patent and that said Letters Patent is hereby corrected as shown below:

Column 2, line 67, the word "s" should be --is--.
Column 4, line 66, the word "ay" should be --any--.

Signed and Sealed this

Nineteenth Day of July, 1994

Attest:

BRUCE LEHMAN

*Attesting Officer*     *Commissioner of Patents and Trademarks*